(12) United States Patent
Yamashita et al.

(10) Patent No.: US 12,405,616 B2
(45) Date of Patent: Sep. 2, 2025

(54) SERVER DEVICE

(71) Applicant: HONDA MOTOR CO., LTD., Tokyo (JP)

(72) Inventors: Akifumi Yamashita, Wako (JP); Ryota Hisada, Tokyo (JP); Takuya Kanisawa, Wako (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 18/549,701

(22) PCT Filed: Mar. 12, 2021

(86) PCT No.: PCT/JP2021/010178
§ 371 (c)(1),
(2) Date: Sep. 8, 2023

(87) PCT Pub. No.: WO2022/190381
PCT Pub. Date: Sep. 15, 2022

(65) Prior Publication Data
US 2024/0168496 A1    May 23, 2024

(51) Int. Cl.
*G05D 1/648* (2024.01)
*A01D 34/00* (2006.01)
(Continued)

(52) U.S. Cl.
CPC ......... *G05D 1/6482* (2024.01); *A01D 34/008* (2013.01); *G05D 1/2246* (2024.01);
(Continued)

(58) Field of Classification Search
CPC .. G05D 1/6482; G05D 1/2246; G05D 1/6484; G05D 1/69; G05D 1/693;
(Continued)

(56) References Cited

U.S. PATENT DOCUMENTS

2008/0049217 A1   2/2008   Cappelletti
2016/0157422 A1   6/2016   Kohler et al.
(Continued)

FOREIGN PATENT DOCUMENTS

JP   2017-010161 A   1/2017
JP   2017-134794 A   8/2017
(Continued)

OTHER PUBLICATIONS

Windward et al.; Coordination of Multiple Vehicles for Area Coverage Tasks; Proceedings of the 2007 IEEE/RSJ International Conference on Intelligent Robots and Systems San Diego, CA, USA, Oct. 29-Nov. 2, 2007; pp. 1351-1356 (Year: 2007).*
(Continued)

*Primary Examiner* — Michael J Zanelli
(74) *Attorney, Agent, or Firm* — Rankin, Hill & Clark LLP

(57) ABSTRACT

A server device includes an area setting unit that sets a first area in which a first lawnmower executes first lawn-mowing work in a work area and a second area in which a second lawnmower second lawn-mowing work in the work area, a zone dividing unit that divides the work area into plural virtual zones, a time range setting unit that sets a first time range in which the first lawnmower executes the first lawn-mowing work in each of the virtual zones included in the plural virtual zones and a second time range in which the second lawnmower executes the second lawn-mowing work in each of the virtual zones included in the plural virtual zones, and a notification unit that notifies the first time range and the second time range to a smartphone. Consequently, a user can check a possibilty of contact between the first and second lawnmowers.

18 Claims, 6 Drawing Sheets

(51) Int. Cl.
  *A01D 101/00* (2006.01)
  *G05D 1/224* (2024.01)
  *G05D 1/69* (2024.01)
  *G05D 107/20* (2024.01)

(52) U.S. Cl.
  CPC ............. *G05D 1/6484* (2024.01); *G05D 1/69* (2024.01); *A01D 2101/00* (2013.01); *G05D 2107/23* (2024.01)

(58) Field of Classification Search
  CPC ........... G05D 2107/23; G05D 2105/15; G05D 2109/10; A01D 34/008; A01D 2101/00
  See application file for complete search history.

(56) References Cited

U.S. PATENT DOCUMENTS

| | | |
|---|---|---|
| 2016/0366813 A1 | 12/2016 | Haneda et al. |
| 2017/0285630 A1 | 10/2017 | Yamamura |
| 2018/0255704 A1 | 9/2018 | Kamfors et al. |
| 2019/0021224 A1 | 1/2019 | Kohler et al. |
| 2021/0365044 A1* | 11/2021 | Xue ..................... G05D 1/0289 |

FOREIGN PATENT DOCUMENTS

| | | |
|---|---|---|
| JP | 2017-176115 A | 10/2017 |
| JP | 2018-101410 A | 6/2018 |
| JP | 6370899 B2 | 8/2018 |

OTHER PUBLICATIONS

Extended European Search Report dated Feb. 9, 2024 issued in corresponding European Application No. 21 93 0231 (9 pages).
International Search Report, International Application No. PCT/JP2021/010178, Date of mailing: May 18, 2021, 2 pages.
Written Opinion of the International Searching Authority dated May 18, 2021 filed in PCT/JP2021/010178, 3 pages.
English translation of the International Preliminary Report on Patentability issued Sep. 21, 2023 in the corresponding International application No. PCT/JP2021/010178 (5 pages).

* cited by examiner

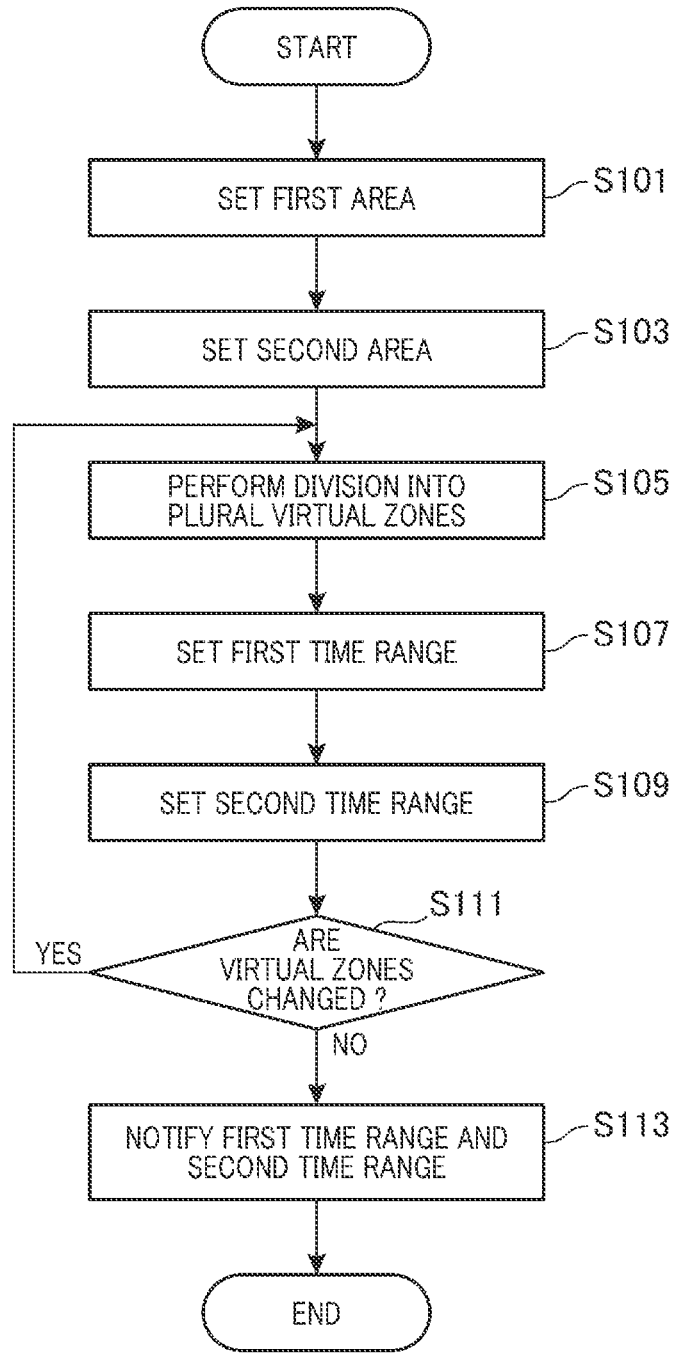

SERVER DEVICE

TECHNICAL FIELD

The present invention relates to a server device that notifies, to a terminal device, a first time range in which a first work machine executes first gardening work in each virtual zone included in plural virtual zones and a second time range in which a second work machine executes second gardening work in each of the virtual zones.

BACKGROUND ART

An autonomously traveling work machine has been known which performs work while autonomously traveling.

For example, as one example of the autonomously traveling work machine, Patent Literature 1 discloses a lawnmower which is driven by a battery, autonomously travels in a lawn ground region, and executes lawn-mowing work.

CITATION LIST

Patent Literature

[Patent Literature 1]
Japanese Patent Laid-Open No. 2017-10161

SUMMARY OF INVENTION

Technical Problem

A lawnmower disclosed in Patent Literature 1 can conduct unmanned lawn-mowing work. Further, in order to more efficiently conduct lawn-mowing work, lawn-mowing work may be conducted by plural lawnmowers. Further, a lawnmower with a larger size and a higher speed can improve work efficiency but is unsuitable for detailed work.

Consequently, it is preferable to conduct lawn-mowing work by using lawnmowers with small sizes and low speeds and lawnmowers with large sizes and high speeds. However, there is a possibility that the lawnmower with a small size and a low speed collides with the lawnmower with a large size and a high speed. Note that the lawnmower with a small size and a low speed corresponds to one example of "first work machine", and the lawnmower with a large size and a high speed corresponds to one example of "second work machine".

The present invention relates to a server device that is capable of dividing a work area into plural virtual zones and of notifying, to a terminal device, a first time range in which the first work machine executes first gardening work in each of the virtual zones included in the plural virtual zones and a second time range in which the second work machine executes second gardening work in each of the virtual zones.

Solution to Problem

A server device according to the present invention includes: an area setting unit which sets a first area in which a first work machine executes first gardening work in a work area and a second area in which a second work machine executes second gardening work in the work area; a zone dividing unit which divides the work area into plural virtual zones; a time range setting unit which sets a first time range in which the first work machine executes the first gardening work in each of the virtual zones included in the plural virtual zones and a second time range in which the second work machine executes the second gardening work in each of the virtual zones included in the plural virtual zones; and a notification unit which notifies the first time range and the second time range to a terminal device connected to be capable of communication.

As for the server device according to the present invention, in the server device, the second work machine has a larger size than the first work machine.

As for the server device according to the present invention, in the server device, the second work machine executes the second gardening work while autonomously traveling.

As for the server device according to the present invention, in the server device, the first work machine executes the first gardening work while autonomously traveling.

As for the server device according to the present invention, in the server device, the time range setting unit sets the first time range and the second time range so as to avoid a situation where the first work machine and the second work machine execute work in the same virtual zone at the same time point.

As for the server device according to the present invention, in the server device, the time range setting unit sets the first time range and the second time range so as to avoid a situation where the first work machine and the second work machine execute work in neighboring virtual zones at the same time point.

As for the server device according to the present invention, in the server device, the zone dividing unit divides the work area such that each of the plural virtual zones extends along a longitudinal direction of the work area.

As for the server device according to the present invention, in the server device, the zone dividing unit divides the work area into the plural virtual zones based on an input from a user.

As for the server device according to the present invention, the server device further includes a time calculation unit which calculates a work time of the first work machine and a work time of the second work machine in each of the plural virtual zones.

As for the server device according to the present invention, the server device further includes a zone changing unit which changes at least one of a shape, a size, and an area of each of the plural virtual zones based on the work time of the second work machine in each of the plural virtual zones.

As for the server device according to the present invention, in the server device, the area setting unit sets the first area and sets an area except the first area in the work area as the second area.

As for the server device according to the present invention, in the server device, the area setting unit sets the second area and sets an area except the second area in the work area as the first area.

As for the server device according to the present invention, in the server device, the area setting unit determines whether or not the second work machine is capable of passing through the second area based on a size of the second work machine, and in a case where a determination is made that the second work machine is not capable of passing through the second area, the area setting unit sets the second area through which the second work machine is determined to be not capable of passing as the first area.

Advantageous Effects of Invention

A server device according to the present invention can divide a work area into plural virtual zones and notify, to a terminal device, a first time range in which a first work machine executes first gardening work in each of the virtual zones included in the plural virtual zones and a second time range in which a second work machine executes second gardening work in each of the virtual zones. Consequently, a user can check a possibility of contact between the first work machine and the second work machine.

BRIEF DESCRIPTION OF DRAWINGS

FIG. 6 is a flowchart illustrating one example of a process by a control unit.

DESCRIPTION OF EMBODIMENTS

An embodiment will hereinafter be described with reference to drawings.

Figure 1:
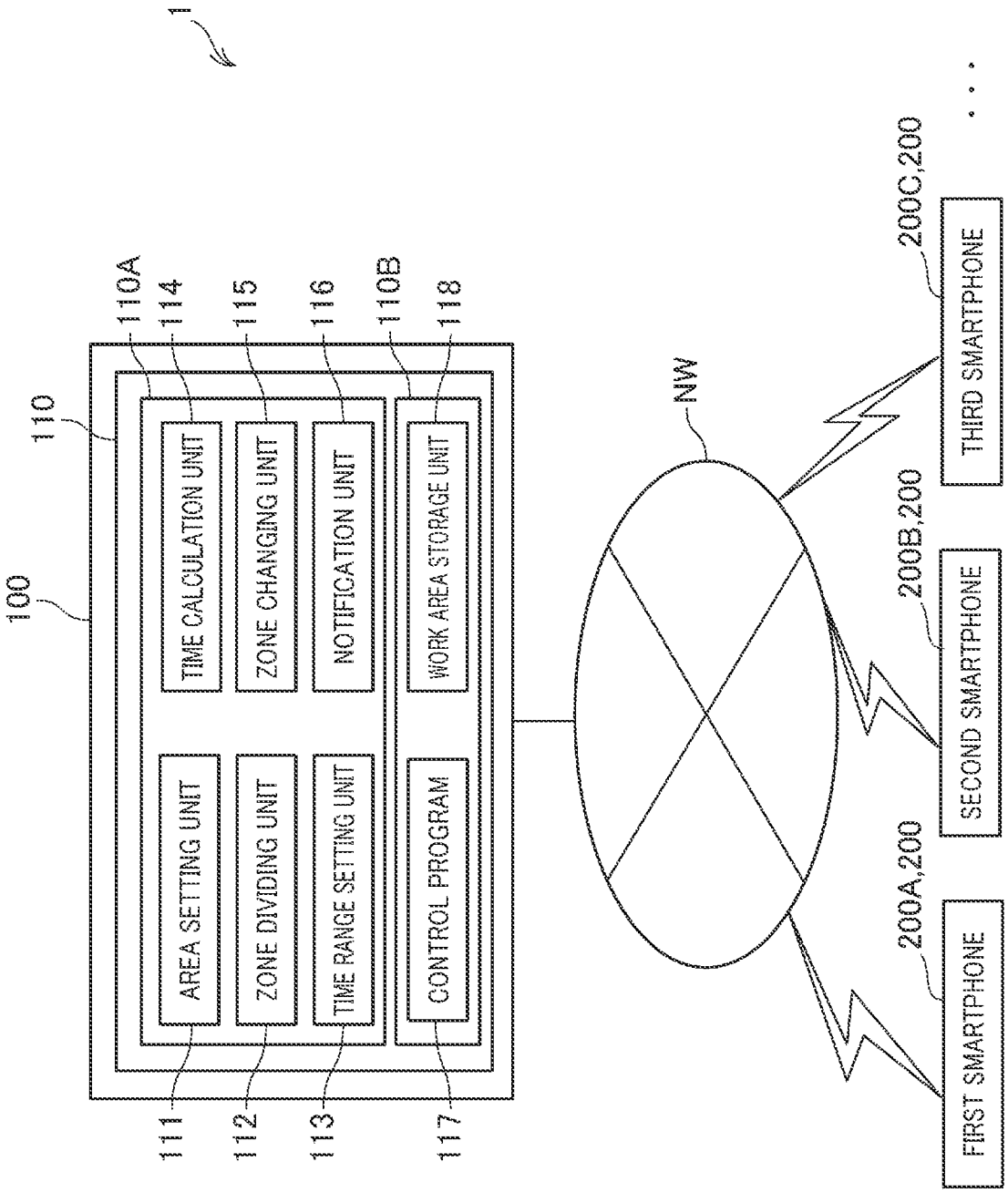
FIG. 1 is a diagram illustrating one example of a server device according to the present embodiment.

FIG. 1 is a diagram illustrating one example of a server device 100 according to the present embodiment.

As illustrated in FIG. 1, a gardening assistance system 1 includes the server device 100 and smartphones 200.

The server device 100 is connected with the smartphones 200 via a network NW to be capable of communication with those. The network NW is the Internet, for example.

In the present embodiment, a description will be made about a case where the network NW is the Internet, but this is not restrictive. The network NW may be a LAN (local area network) or may be a WAN (wide area network).

The smartphones 200 include a first smartphone 200A, a second smartphone 200B, and a third smartphone 200C. The first smartphone 200A is carried by a first user, the second smartphone 200B is carried by a second user, and the third smartphone 200C is carried by a third user.

Each of the first smartphone 200A, the second smartphone 200B, and the third smartphone 200C has generally the same configuration. Accordingly, in the following descriptions, in a case where the first smartphone 200A, the second smartphone 200B, and the third smartphone 200C are not distinguished from each other, each of those may be denoted as smartphone 200.

Each of the first smartphone 200A, the second smartphone 200B, and the third smartphone 200C is connected with the server device 100 to be capable of communication by wireless communication such as Wi-Fi (registered trademark), for example. Further, each of the first smartphone 200A, the second smartphone 200B, and the third smartphone 200C includes an LCD (liquid crystal display).

Each of the first smartphone 200A, the second smartphone 200B, and the third smartphone 200C requests the server device 100 to divide a work area AR into plural virtual zones VZ and to notify a first time range TZ1N in which a first lawnmower MW1 executes first lawn-mowing work in each virtual zone VZN included in plural virtual zones VZN (N=1 to M), a second time range TZ2N in which a second lawnmower MW2 executes second lawn-mowing work in each of the virtual zones VZN, and so forth. Further, each of the first smartphone 200A, the second smartphone 200B, and the third smartphone 200C receives, from the server device 100, information such as the first time range TZ1N and the second time range TZ2N and displays, on the LCD, an image which represents the first time range TZ1N, the second time range TZ2N, and so forth.

The work area AR, the first lawnmower MW1, the second lawnmower MW2, the virtual zone VZN, the first time range TZ1N, and the second time range TZ2N will be described later in a description about a configuration of the server device 100.

The smartphone 200 corresponds to one example of "terminal device".

The server device 100 includes a control unit 110. The control unit 110 controls a process by the server device 100. The control unit 110 includes a processor 110A and a memory 110B.

The processor 110A is configured with a CPU (central processing unit), an MPU (micro-processing unit), or the like, for example.

The memory 110B includes a RAM (random access memory), a ROM (read-only memory), or the like, for example. Further, the memory 110B may include an HDD (hard disk drive), an SSD (solid state drive), or the like. The memory 110B stores a control program 117.

The control unit 110 includes an area setting unit 111, a zone dividing unit 112, a time range setting unit 113, a time calculation unit 114, a zone changing unit 115, a notification unit 116, and a work area storage unit 118.

Specifically, the processor 110A executes the control program 117 and thereby functions as the area setting unit 111, the zone dividing unit 112, the time range setting unit 113, the time calculation unit 114, the zone changing unit 115, and the notification unit 116. Further, the processor 110A executes the control program 117 and thereby causes the memory 110B to function as the work area storage unit 118.

The work area storage unit 118 stores information about a target work area AR in which lawn-mowing work as one example of gardening work is executed. The work area storage unit 118 stores a plan view of the work area AR and inclination information, for example. The inclination information includes an inclination angle of a lawn surface included in the work area AR. As described later with reference to FIG. 2, the work area AR includes trees TR and benches BN, for example.

In the present embodiment, a description will be made about a case where the lawn-mowing work is executed as one example of the gardening work.

The area setting unit 111 sets a first area AR1 in which the first lawnmower MW1 executes the first lawn-mowing work in the work area AR and a second area AR2 in which the second lawnmower MW2 executes the second lawn-mowing work in the work area AR. The area setting unit 111 accepts the work area AR from the smartphone 200, for example.

The work area AR denotes an area in which the lawn-mowing work is executed.

The first area AR1 denotes an area in which the first lawn-mowing work is executed by the first lawnmower MW1. The second area AR2 denotes an area in which the second lawn-mowing work is executed by the second lawnmower MW2. The first lawn-mowing work is lawn-mowing work which is executed by the first lawnmower MW1, and the second lawn-mowing work is lawn-mowing work which is executed by the second lawnmower MW2.

The first lawn-mowing work corresponds to one example of "first gardening work".

The second lawn-mowing work corresponds to one example of "second gardening work".

The first lawnmower MW1 executes the first lawn-mowing work while autonomously traveling. The first lawn-mowing work is detailed lawn-mowing work for a part around a trunk of the tree TR, a part below and around the bench BN, and so forth. The first lawnmower MW1 is an autonomously traveling lawnmower with a small size and a low speed compared to the second lawnmower MW2.

The autonomously traveling lawnmower is a lawnmower which executes lawn-mowing work while autonomously traveling. The autonomously traveling lawnmower includes a mowing blade disc and can mow lawn grass by the mowing blade disc which is rotated and driven while traveling is performed, for example.

The first lawnmower MW1 corresponds to one example of "first work machine".

The second lawnmower MW2 executes the second lawn-mowing work while autonomously traveling. The second lawn-mowing work is lawn-mowing work which is different from the first lawn-mowing work and is lawn-mowing work for a vast area. The second lawnmower MW2 is an autonomously traveling lawnmower with a large size and a high speed compared to the first lawnmower MW1. For example, one mowing blade disc is arranged in the first lawnmower MW1, but two mowing blade discs are arranged in a direction orthogonal to an advancing direction, that is, a width direction in the second lawnmower MW2. Further, for example, a traveling speed of the second lawnmower MW2 is two times or more the traveling speed of the first lawnmower MW1. For example, the traveling speed of the second lawnmower MW2 is three times the traveling speed of the first lawnmower MW1.

The second lawnmower MW2 corresponds to one example of "second work machine".

The area setting unit 111 sets the first area AR1 and the second area AR2.

The area setting unit 111 sets the first area AR1 and sets an area except the first area AR1 in the work area AR as the second area AR2, for example.

Further, the area setting unit 111 determines whether or not the second lawnmower MW2 is capable of passing through the second area AR2 based on the size of the second lawnmower MW2. Then, in a case where it is determined that the second lawnmower MW2 is not capable of passing through the second area AR2, the area setting unit 111 sets the second area AR2 through which the second lawnmower MW2 is determined to be not capable of passing as the first area AR1.

In the present embodiment, a description will be made about a case where the area setting unit 111 sets the first area AR1 and sets the area except the first area AR1 in the work area AR as the second area AR2, but this is not restrictive. It is sufficient that the area setting unit 111 sets the first area AR1 and the second area AR2. For example, the area setting unit 111 may set the second area AR2 and set an area except the second area AR2 in the work area AR as the first area AR1.

In this case, because the second area AR2 is earlier set in which the second lawnmower MW2 with a large size and a high speed compared to the first lawnmower MW1 performs the lawn-mowing work, the second area AR2 can be set such that the second lawnmower MW2 can efficiently work.

The zone dividing unit 112 divides the work area AR into the plural virtual zones VZN (N=1 to M). A number M denotes the number of virtual zones VZN. The zone dividing unit 112 divides the work area AR such that each of the plural virtual zones VZN extends along a longitudinal direction of the work area AR. Further, the zone dividing unit 112 divides the work area AR into the plural virtual zones VZN based on an input from a user.

The virtual zone VZN will further be described with reference to FIG. 2 and FIG. 4.

The time range setting unit 113 sets the first time range TZ1N (N=1 to M) in which the first lawnmower MW1 executes the first lawn-mowing work in each of the virtual zones VZN included in the plural virtual zones VZN and the second time range TZ2N (N=1 to M) in which the second lawnmower MW2 executes the second lawn-mowing work in each of the virtual zones VZN included in the plural virtual zones VZN.

For example, the first time range TZ1N denotes a time range in which the first lawnmower MW1 executes the first lawn-mowing work in a first virtual zone VZ1N or a second virtual zone VZ2N. Further, for example, the second time range TZ2N denotes a time range in which the second lawnmower MW2 executes the second lawn-mowing work in the first virtual zone VZ1N or the second virtual zone VZ2N.

The first virtual zone VZ1N will further be described with reference to FIG. 2.

The second virtual zone VZ2N will further be described with reference to FIG. 4.

The time range setting unit 113 sets the first time ranges TZ1N and the second time ranges TZ2N so as to avoid a situation where the first lawnmower MW1 and the second lawnmower MW2 execute work in the same virtual zone VZN at the same time point.

Further, the time range setting unit 113 sets the first time ranges TZ1N and the second time ranges TZ2N so as to avoid a situation where the first lawnmower MW1 and the second lawnmower MW2 execute work in neighboring virtual zones VZN at the same time point.

The first time range TZ1N and the second time range TZ2N will further be described with reference to FIG. 3 and FIG. 5.

The time calculation unit 114 calculates a work time T1N of the first lawnmower MW1 and a work time T2N of the second lawnmower MW2 in each of the plural virtual zones VZN.

Further, the time calculation unit 114 calculates a first work time TW1 based on the work time T1N. The first work time TW1 denotes a total work time of the first lawnmower MW1. The time calculation unit 114 calculates a second work time TW2 based on the work time T2N. For example, the time calculation unit 114 integrates work times T2N and thereby calculates the second work time TW2. The second work time TW2 denotes a total work time of the second lawnmower MW2.

The time calculation unit 114 may calculate the first work time TW1 based on an area of the first area AR1 and calculate a second work time TW2 based on an area of the second area AR2, for example.

Specifically, the time calculation unit 114 calculates the first work time TW1 based on the area of the first area AR1, a size of the mowing blade disc of the first lawnmower MW1, the number of mowing blade discs of the first lawnmower MW1, and the traveling speed of the first lawnmower MW1, for example. The time calculation unit 114 calculates the second work time TW2 based on an area of the second area AR2, the size of the mowing blade disc of the second lawnmower MW2, the number of mowing blade discs of the second lawnmower MW2, and the traveling speed of the second lawnmower MW2, for example.

Further, the time calculation unit 114 corrects the first work time TW1 based on complexity of the first area AR1 and corrects the second work time TW2 based on complexity of the second area AR2. The complexity denotes an extent of complexness. The time calculation unit 114 performs correction such that the first work time TW1 becomes longer as the complexity of the first area AR1 is higher and performs correction such that the second work time TW2 becomes longer as the complexity of the second area AR2 is higher, for example.

Specifically, the time calculation unit 114 decides the complexity of the first area AR1 based on the number of trees TR and the number of benches BN, the trees TR and benches BN being included in the first area AR1, for example. The complexity of the first area AR1 is calculated to be higher as the number of trees TR included in the first area AR1 is greater, and the complexity of the first area AR1 is calculated to be higher as the number of benches BN included in the first area AR1 is greater.

Further, the time calculation unit 114 decides the complexity of the second area AR2 based on complexity of a shape of a periphery of the second area AR2 and on complexity of a shape of a boundary line between the second area AR2 and the first area AR1, for example.

Further, the time calculation unit 114 corrects the first work time TW1 based on a quantity of inclinations in the first area AR1 and corrects the second work time TW2 based on a quantity of inclinations in the second area AR2. The time calculation unit 114 performs correction such that the first work time TW1 becomes longer as the quantity of inclinations in the first area AR is greater and performs correction such that the second work time TW2 becomes longer as the quantity of inclinations in the second area AR2 is greater, for example.

Further, the time calculation unit 114 corrects the first work time TW1 based on an inclination angle of the first area AR1 and corrects the second work time TW2 based on an inclination angle of the second area AR2. The time calculation unit 114 performs correction such that the first work time TW1 becomes longer as the inclination angle of the first area AR1 is greater and performs correction such that the second work time TW2 becomes longer as the inclination angle of the second area AR2 is greater, for example.

The zone changing unit 115 changes at least one of a shape, a size, and an area of each of the plural virtual zones VZN based on the work time T2N of the second lawnmower MW2 in each of the plural virtual zones VZN. The zone changing unit 115 changes the size of each of the plural virtual zones VZN such that the work time T2N of the second lawnmower MW2 in each of the plural virtual zones VZN becomes generally the same, for example.

In the present embodiment, a description will be made about a case where the zone changing unit 115 performs a change from the first virtual zone VZ1N (N=1 to 4) illustrated in FIG. 2 to the second virtual zone VZ2N (N=1 to 8) illustrated in FIG. 4.

The notification unit 116 notifies the first time ranges TZ1N and the second time ranges TZ2N to the first smartphone 200A. Further, the notification unit 116 causes the first smartphone 200A to display the first time range TZ1N and the second time range TZ2N while associating those with each of the plural virtual zones VZN, for example.

Figure 2:
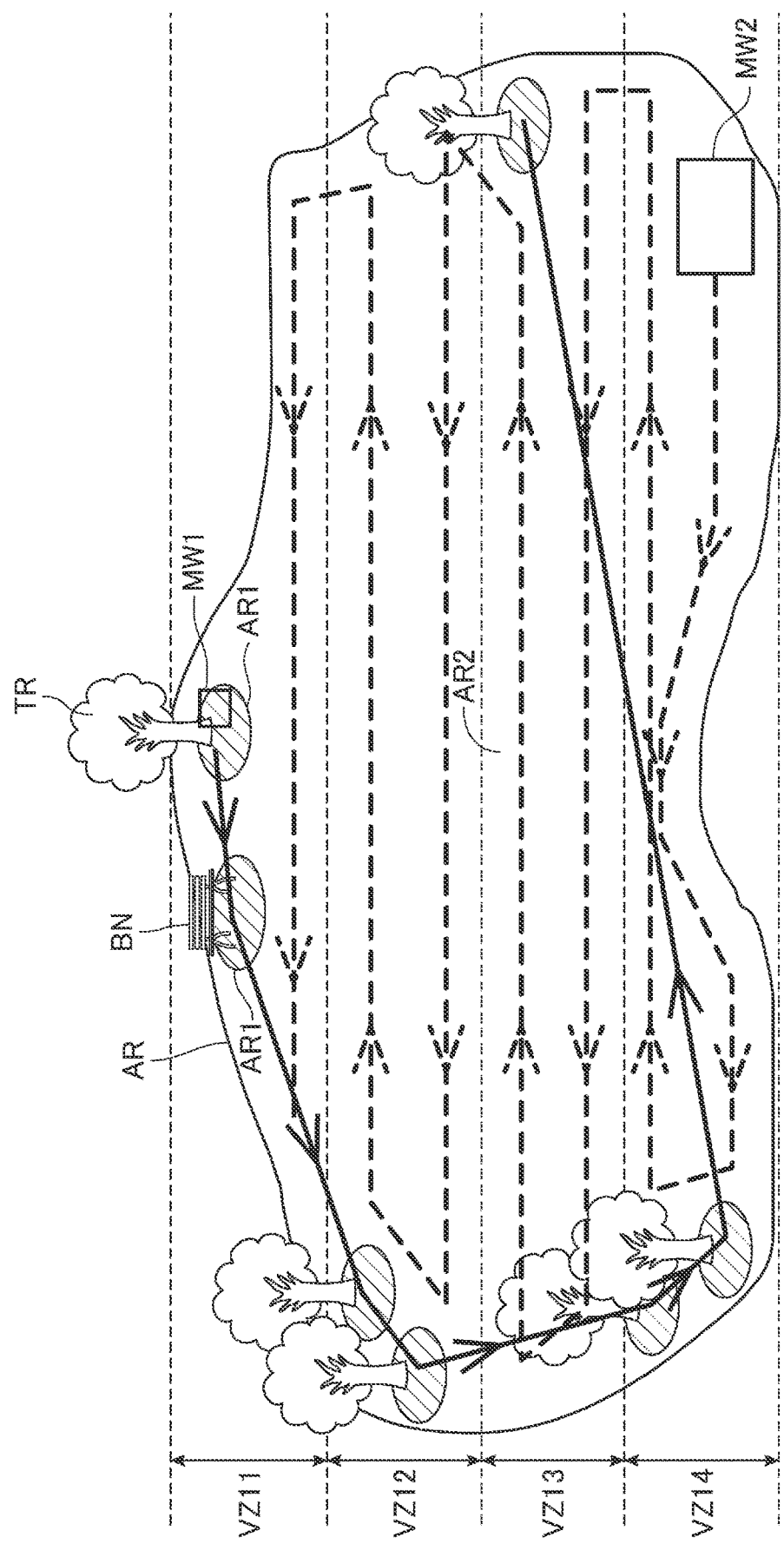
FIG. 2 is a diagram illustrating examples of a work area and first virtual zones.

For example, as illustrated in FIG. 2, the notification unit 116 causes the first smartphone 200A to display the first time range TZ1N and the second time range TZ2N while associating those with each of the first virtual zones VZ1N (N=1 to 4). Further, for example, as illustrated in FIG. 4, the notification unit 116 causes the first smartphone 200A to display the first time range TZ1N and the second time range TZ2N while associating those with each of the second virtual zones VZ2N (N=1 to 8).

FIG. 2 is a diagram illustrating examples of the work area AR and the first virtual zones VZ1N.

As illustrated in FIG. 2, in the work area AR, the trees TR are planted, and the bench BN is arranged.

Further, in the work area AR, the first areas AR1 and the second area AR2 are set by the area setting unit 111. The first areas AR1 are set to parts around the trunks of the trees TR and the part below and around the bench BN. The first areas AR1 are hatched.

Further, in the work area AR, one first lawnmower MW1 and one second lawnmower MW2 are arranged. The first lawnmower MW1 is arranged in the part around the trunk of the tree TR. The second lawnmower MW2 is arranged in the second area AR2.

The area setting unit 111 sets, as the first areas AR1, areas for which detailed lawn-mowing work is necessary such as the part around the trunk of the tree TR and the part below and around the bench BN, for example. Furthermore, the area setting unit 111 sets the area except the first areas AR1 in the work area AR as the second area AR2.

Consequently, the first area AR1 and the second area AR2 can properly be set.

Further, as illustrated in FIG. 2, the first virtual zones VZ1N (N=1 to 4) are set by the zone dividing unit 112 as indicated by broken lines. The first virtual zone VZ1N corresponds to one example of the virtual zone VZN.

The first virtual zones VZ1N are configured with four first virtual zones VZ11 to VZ14. The zone dividing unit 112 divides the work area AR such that a distance, in an up-down direction, of each of the four first virtual zones VZ11 to VZ14 becomes generally the same.

Further, the zone dividing unit 112 divides the work area AR such that each of the first virtual zones VZ1N extends along the longitudinal direction of the work area AR, that is, a left-right direction in FIG. 2. The four first virtual zones VZ11 to VZ14 are lined up in the up-down direction in FIG. 2.

As illustrated in FIG. 2, the time range setting unit 113 sets a traveling path of each of the first lawnmower MW1 and the second lawnmower MW2. In FIG. 2, the traveling path of the first lawnmower MW1 is indicated by solid lines, and the traveling path of the second lawnmower MW2 is indicated by broken lines.

As illustrated in FIG. 2, the first lawnmower MW1 executes the first lawn-mowing work while traveling counterclockwise along an outer periphery of the work area AR with an upper end of the first virtual zone VZ11 being a start point. That is, while executing the first lawn-mowing work, the first lawnmower MW1 travels from the first virtual zone VZ11, travels via the first virtual zone VZ12 and the first virtual zone VZ13, and reaches the first virtual zone VZ14.

Subsequently, the first lawnmower MW1 completes the first lawn-mowing work in the first virtual zone VZ14 and thereafter moves from a left end of the first virtual zone VZ14 to the first area AR1 arranged at a right end of the first virtual zone VZ13. Then, the first lawnmower MW1 executes the first lawn-mowing work at the right end of the first virtual zone VZ13. Subsequently, the first lawn-mowing work is finished.

The second lawnmower MW2 executes the second lawn-mowing work while traveling in the left-right direction with a right end of the first virtual zone VZ14 being a start point. That is, the second lawnmower MW2 executes the second lawn-mowing work while traveling in a leftward direction to the left end of the first virtual zone VZ14. Subsequently, the second lawnmower MW2 executes the second lawn-mowing work while traveling in an upward direction only for a general lawn-mowing width of the second lawnmower MW2 in the first virtual zone VZ14. Subsequently, the second lawnmower MW2 executes the second lawn-mowing work while traveling in a rightward direction to the right end in the first virtual zone VZ14.

Subsequently, the second lawnmower MW2 executes the second lawn-mowing work while traveling from the first virtual zone VZ14 to the first virtual zone VZ13. Then, the second lawnmower MW2 executes the second lawn-mowing work while traveling to make only one round trip in the left-right direction in the first virtual zone VZ13, similarly to the first virtual zone VZ14. Subsequently, the second lawnmower MW2 executes the second lawn-mowing work while traveling from the first virtual zone VZ13 to the first virtual zone VZ12. Then, the second lawnmower MW2 executes the second lawn-mowing work while traveling to make only one round trip in the left-right direction in the first virtual zone VZ12, similarly to the first virtual zone VZ14. Subsequently, the second lawnmower MW2 executes the second lawn-mowing work while traveling from the first virtual zone VZ12 to the first virtual zone VZ11. Then, the second lawnmower MW2 executes the second lawn-mowing work while traveling from a right end to a left end in the first virtual zone VZ11 and finishes the second lawn-mowing work.

Figure 3:
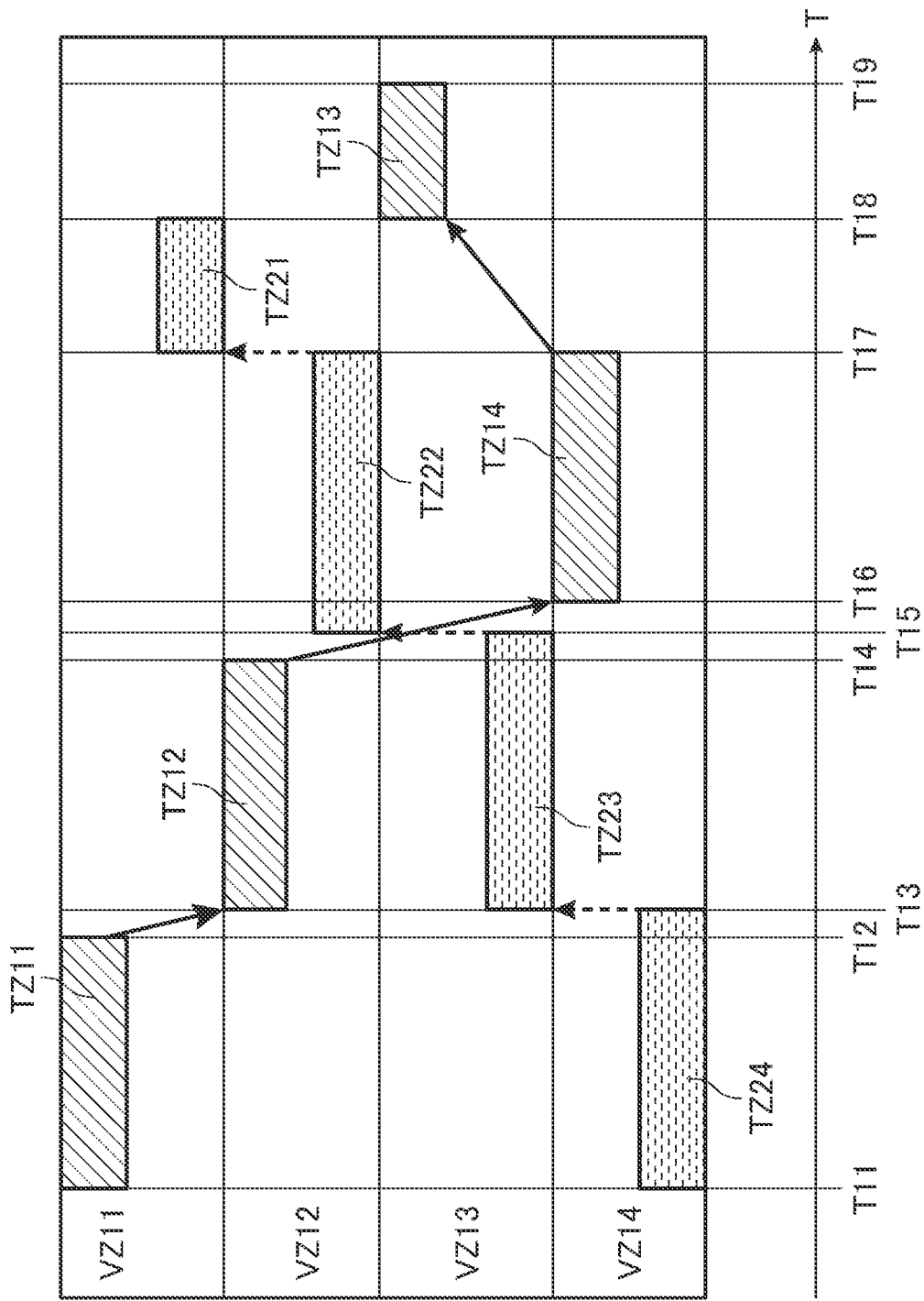
FIG. 3 is a diagram illustrating examples of the first virtual zones, first time ranges, and second time ranges.

FIG. 3 is a diagram illustrating examples of the first virtual zones VZ1N (N=1 to 4), the first time ranges TZ1N (N=1 to 4), and the second time ranges TZ2N (N=1 to 4). The first virtual zones VZ1N (N=1 to 4) illustrated in FIG. 3 correspond to the first virtual zones VZ1N (N=1 to 4) illustrated in FIG. 2. Further, the horizontal axis in FIG. 3 represents a time T.

The first time ranges TZ1N include four first time ranges TZ11 to TZ14. The first time ranges TZ1N are set by the time range setting unit 113. In FIG. 3, each of the first time ranges TZ11 to TZ14 is indicated by a rectangular region hatched by oblique lines.

The first time range TZ11 denotes a time range in which the first lawnmower MW1 executes the first lawn-mowing work in the first virtual zone VZ11. The first time range TZ11 denotes the time T from a time T11 to a time T12.

The first time range TZ12 denotes a time range in which the first lawnmower MW1 executes the first lawn-mowing work in the first virtual zone VZ12. The first time range TZ12 denotes the time T from a time T13 to a time T14.

The first time range TZ14 denotes a time range in which the first lawnmower MW1 executes the first lawn-mowing work in the first virtual zone VZ14. The first time range TZ14 denotes the time T from a time T16 to a time T17.

The first time range TZ13 denotes a time range in which the first lawnmower MW1 executes the first lawn-mowing work in the first virtual zone VZ13. The first time range TZ13 denotes the time T from a time T18 to a time T19.

A solid line arrow from the first time range TZ11 to the first time range TZ12 indicates that the first lawnmower MW1 moves from the first virtual zone VZ11 to the first virtual zone VZ12. A time necessary for movement from the first virtual zone VZ11 to the first virtual zone VZ12 is the time T from the time T12 to the time T13.

A solid line arrow from the first time range TZ12 to the first time range TZ14 indicates that the first lawnmower MW1 moves from the first virtual zone VZ12 to the first virtual zone VZ14. A time necessary for movement from the first virtual zone VZ12 to the first virtual zone VZ14 is the time T from the time T14 to the time T16.

A solid line arrow from the first time range TZ14 to the first time range TZ13 indicates that the first lawnmower MW1 moves from the first virtual zone VZ14 to the first virtual zone VZ13. A time necessary for movement from the first virtual zone VZ14 to the first virtual zone VZ13 is the time T from the time T17 to the time T18.

The second time ranges TZ2N include four second time ranges TZ21 to TZ24. The second time ranges TZ2N are set by the time range setting unit 113. In FIG. 3, each of the second time ranges TZ21 to TZ24 is indicated by a rectangular region hatched by dotted lines.

The second time range TZ24 denotes a time range in which the second lawnmower MW2 executes the second lawn-mowing work in the first virtual zone VZ14. The second time range TZ24 denotes the time T from the time T1*l* to the time T13.

The second time range TZ23 denotes a time range in which the second lawnmower MW2 executes the second lawn-mowing work in the first virtual zone VZ13. The second time range TZ23 denotes the time T from the time T13 to a time T15.

The second time range TZ22 denotes a time range in which the second lawnmower MW2 executes the second lawn-mowing work in the first virtual zone VZ12. The second time range TZ22 denotes the time T from the time T15 to the time T17.

The second time range TZ21 denotes a time range in which the second lawnmower MW2 executes the second lawn-mowing work in the first virtual zone VZ11. The second time range TZ21 denotes the time T from the time T17 to the time T18.

As illustrated in FIG. 3, the time range setting unit 113 sets the first time ranges TZ1N and the second time ranges TZ2N so as to avoid a situation where the first lawnmower MW1 and the second lawnmower MW2 execute work in the same first virtual zone VZ1N (N=1 to 4) at the same time point. Consequently, contact between the first lawnmower MW1 and the second lawnmower MW2 can be avoided.

However, in a time range from the time T13 to the time T14, the first lawnmower MW1 executes the first lawn-mowing work in the first virtual zone VZ12, and the second lawnmower MW2 executes the second lawn-mowing work in the first virtual zone VZ13 neighboring the first virtual zone VZ12. That is, from the time T13 to the time T14, the time range setting unit 113 has not been able to set the first time range TZ1N and the second time range TZ2N such that a situation is avoided where the first lawnmower MW1 and the second lawnmower MW2 execute work in neighboring first virtual zones VZ1N at the same time point.

Figure 4:
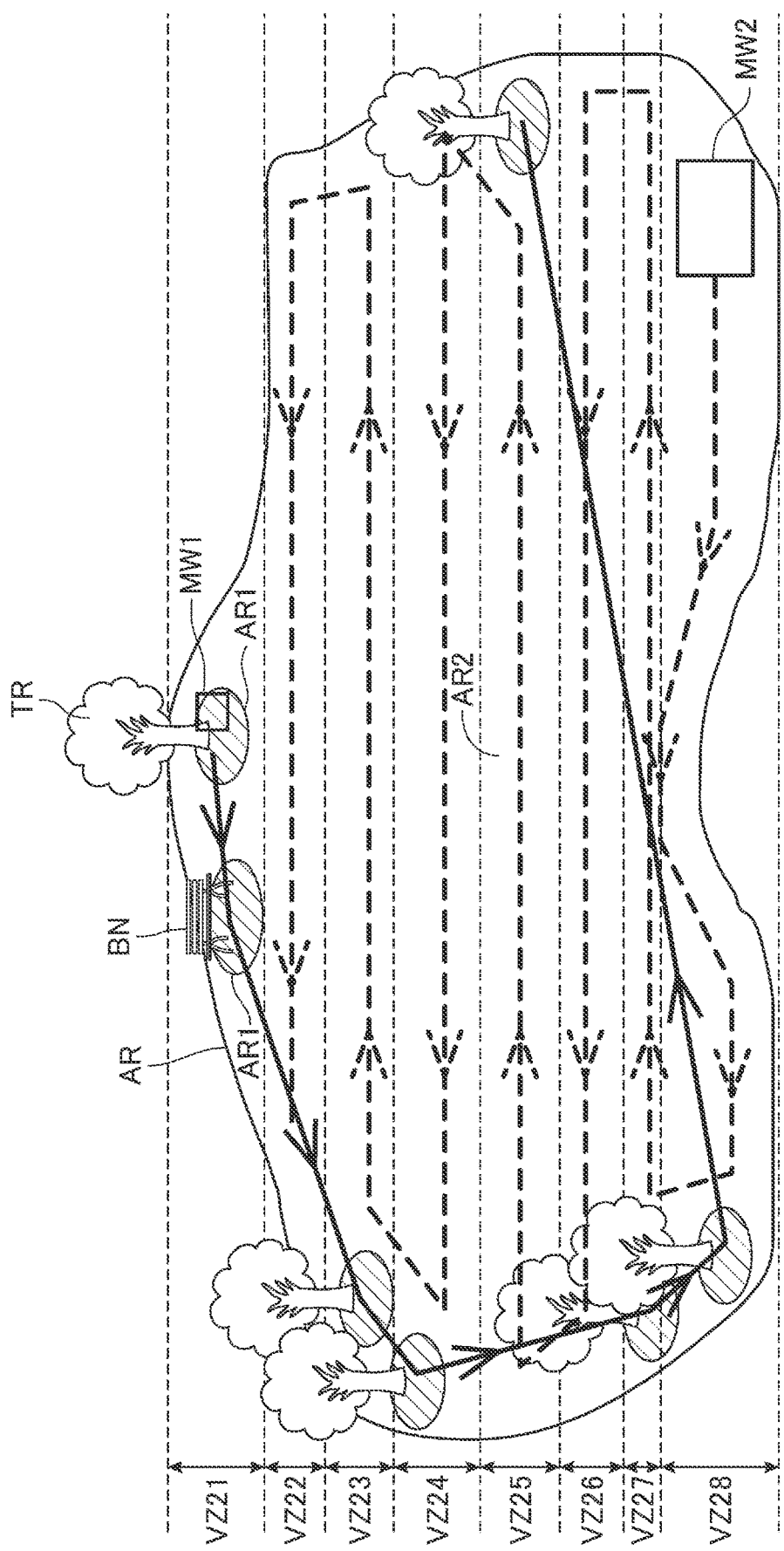
FIG. 4 is a diagram illustrating examples of the work area and second virtual zones.

In order to solve this situation, the zone changing unit 115 changes the first virtual zones VZ1N (N=1 to 4) illustrated in FIG. 2 to the second virtual zones VZ2N (N=1 to 8) illustrated in FIG. 4.

FIG. 4 is a diagram illustrating examples of the work area AR and the second virtual zones VZ2N (N=1 to 8).

As illustrated in FIG. 4, the second virtual zones VZ2N (N=1 to 8) are set by the zone dividing unit 112 as indicated by broken lines. The second virtual zone VZ2N corresponds to one example of the virtual zone VZN.

The second virtual zones VZ2N are configured with eight second virtual zones VZ21 to VZ28. The zone dividing unit 112 divides the work area AR such that a distance, in the up-down direction, of each of the eight second virtual zones VZ21 to VZ28 becomes generally the same.

Further, the zone dividing unit 112 divides the work area AR such that each of the second virtual zones VZ2N extends along the longitudinal direction of the work area AR, that is, the left-right direction in FIG. 4. The eight second virtual zones VZ21 to VZ28 are lined up in the up-down direction in FIG. 4.

As illustrated in FIG. 4, the time range setting unit 113 sets the traveling path of each of the first lawnmower MW1 and the second lawnmower MW2. In FIG. 4, the traveling path of the first lawnmower MW1 is indicated by solid lines, and the traveling path of the second lawnmower MW2 is indicated by broken lines.

The traveling path of the first lawnmower MW1, which is illustrated in FIG. 4, is the same as the traveling path of the first lawnmower MW1, which is illustrated in FIG. 2. Further, the traveling path of the second lawnmower MW2, which is illustrated in FIG. 4, is the same as the traveling path of the second lawnmower MW2, which is illustrated in FIG. 2. Accordingly, descriptions will not be made about the traveling path of the first lawnmower MW1 and the traveling path of the second lawnmower MW2, which are illustrated in FIG. 4.

Figure 5:
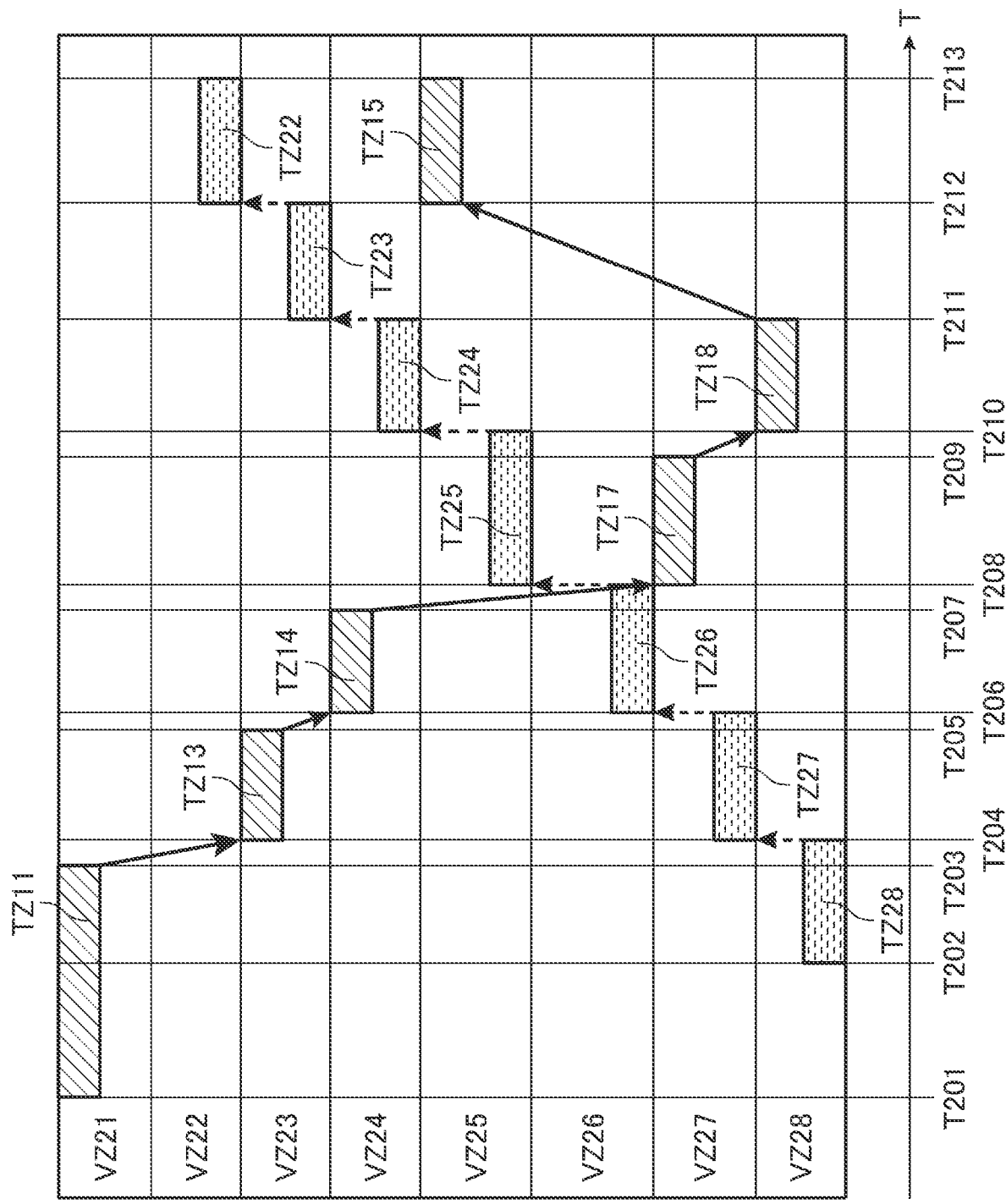
FIG. 5 is a diagram illustrating examples of the second virtual zones, first time ranges, and second time ranges.

FIG. 5 is a diagram illustrating examples of the second virtual zones VZ2N (N=1 to 8), the first time ranges TZ1N, and the second time ranges TZ2N. The second virtual zones VZ2N illustrated in FIG. 5 correspond to the second virtual zones VZ2N illustrated in FIG. 4. Further, the horizontal axis in FIG. 5 represents the time T.

The first time ranges TZ1N include six first time ranges TZ11, TZ13, TZ14, TZ15, TZ17, and TZ18. The first time ranges TZ1N are set by the time range setting unit 113. In FIG. 5, each of the first time ranges TZ1N is indicated by a rectangular region hatched by oblique lines.

The first time range TZ11 denotes a time range in which the first lawnmower MW1 executes the first lawn-mowing work in the second virtual zone VZ21. The first time range TZ11 denotes the time T from a time T201 to a time T203.

The first time range TZ13 denotes a time range in which the first lawnmower MW1 executes the first lawn-mowing work in the second virtual zone VZ23. The first time range TZ13 denotes the time T from a time T204 to a time T205.

The first time range TZ14 denotes a time range in which the first lawnmower MW1 executes the first lawn-mowing work in the second virtual zone VZ24. The first time range TZ14 denotes the time T from a time T206 to a time T207.

The first time range TZ17 denotes a time range in which the first lawnmower MW1 executes the first lawn-mowing work in the second virtual zone VZ27. The first time range TZ17 denotes the time T from a time T208 to a time T209.

The first time range TZ18 denotes a time range in which the first lawnmower MW1 executes the first lawn-mowing work in the second virtual zone VZ28. The first time range TZ18 denotes the time T from a time T210 to a time T211.

The first time range TZ15 denotes a time range in which the first lawnmower MW1 executes the first lawn-mowing work in the second virtual zone VZ25. The first time range TZ15 denotes the time T from a time T212 to a time T213.

A solid line arrow from the first time range TZ11 to the first time range TZ13 indicates that the first lawnmower MW1 moves from the second virtual zone VZ21 to the second virtual zone VZ23. A time necessary for movement from the second virtual zone VZ21 to the second virtual zone VZ23 is the time T from the time T203 to the time T204.

A solid line arrow from the first time range TZ13 to the first time range TZ14 indicates that the first lawnmower MW1 moves from the second virtual zone VZ23 to the second virtual zone VZ24. A time necessary for movement from the second virtual zone VZ23 to the second virtual zone VZ24 is the time T from the time T205 to the time T206.

A solid line arrow from the first time range TZ14 to the first time range TZ17 indicates that the first lawnmower MW1 moves from the second virtual zone VZ24 to the second virtual zone VZ27. A time necessary for movement from the second virtual zone VZ24 to the second virtual zone VZ27 is the time T from the time T207 to the time T208.

A solid line arrow from the first time range TZ17 to the first time range TZ18 indicates that the first lawnmower MW1 moves from the second virtual zone VZ27 to the second virtual zone VZ28. A time necessary for movement from the second virtual zone VZ27 to the second virtual zone VZ28 is the time T from the time T209 to the time T210.

A solid line arrow from the first time range TZ18 to the first time range TZ15 indicates that the first lawnmower MW1 moves from the second virtual zone VZ28 to the second virtual zone VZ25. A time necessary for movement from the second virtual zone VZ28 to the second virtual zone VZ25 is the time T from the time T211 to the time T212.

The second time ranges TZ2N include seven second time ranges TZ22 to TZ28. The second time ranges TZ2N are set by the time range setting unit 113. In FIG. 5, each of the second time ranges TZ22 to TZ28 is indicated by a rectangular region hatched by dotted lines.

The second time range TZ28 denotes a time range in which the second lawnmower MW2 executes the second lawn-mowing work in the second virtual zone VZ28. The second time range TZ28 denotes the time T from a time T202 to the time T204.

The second time range TZ27 denotes a time range in which the second lawnmower MW2 executes the second lawn-mowing work in the second virtual zone VZ27. The second time range TZ27 denotes the time T from the time T204 to the time T206.

The second time range TZ26 denotes a time range in which the second lawnmower MW2 executes the second lawn-mowing work in the second virtual zone VZ26. The second time range TZ26 denotes the time T from the time T206 to the time T208.

The second time range TZ25 denotes a time range in which the second lawnmower MW2 executes the second lawn-mowing work in the second virtual zone VZ25. The second time range TZ25 denotes the time T from the time T208 to the time T210.

The second time range TZ24 denotes a time range in which the second lawnmower MW2 executes the second lawn-mowing work in the second virtual zone VZ24. The second time range TZ24 denotes the time T from the time T210 to the time T211.

The second time range TZ23 denotes a time range in which the second lawnmower MW2 executes the second lawn-mowing work in the second virtual zone VZ23. The second time range TZ23 denotes the time T from the time T211 to the time T212.

The second time range TZ22 denotes a time range in which the second lawnmower MW2 executes the second lawn-mowing work in the second virtual zone VZ22. The second time range TZ22 denotes the time T from the time T212 to the time T213.

As illustrated in FIG. 5, the time range setting unit 113 sets the first time ranges TZ1N and the second time ranges TZ2N so as to avoid a situation where the first lawnmower MW1 and the second lawnmower MW2 execute work in the same second virtual zone VZ2N (N=1 to 8) at the same time point. Consequently, contact between the first lawnmower MW1 and the second lawnmower MW2 can be avoided.

Further, the time range setting unit 113 sets the first time ranges TZ1N and the second time ranges TZ2N so as to avoid a situation where the first lawnmower MW1 and the second lawnmower MW2 execute work in neighboring second virtual zones VZ2N at the same time point. Consequently, approach of the first lawnmower MW1 to the second lawnmower MW2 can be avoided.

FIG. 6 is a flowchart illustrating one example of a process by the control unit 110.

Note that a description will be made about a case where in an initial state in FIG. 6, the control unit 110 accepts, from the first smartphone 200A, a request to notify the first time range TZ1N in which the first lawnmower MW1 executes the first lawn-mowing work in each of the virtual zones VZN included in the plural virtual zones VZN (N=1 to M) set in the work area AR, the second time range TZ2N in which the second lawnmower MW2 executes the second lawn-mowing work in each of the virtual zones VZN, and so forth, and information about the work area AR is stored in the work area storage unit 118.

As illustrated in FIG. 6, first, in step S101, the area setting unit 111 sets the first area AR1 in the work area AR.

Next, in step S103, the area setting unit 111 sets the area except the first area AR1 in the work area AR as the second area AR2.

Next, in step S105, the zone dividing unit 112 divides the work area AR into the plural virtual zones VZN (N=1 to M). The number M is four, for example.

Next, in step S107, the time range setting unit 113 sets the first time range TZ1N in which the first lawnmower MW1 executes the first lawn-mowing work in each of the virtual zones VZN included in the plural virtual zones VZN (N=1 to M).

Next, in step S109, the time range setting unit 113 sets the second time range TZ2N in which the second lawnmower MW2 executes the second lawn-mowing work in each of the virtual zones VZN included in the plural virtual zones VZN (N=1 to M).

Next, in step S111, the zone changing unit 115 determines whether or not the virtual zones VZN are changed.

For example, the zone changing unit 115 determines whether or not the first time ranges TZ1N and the second time ranges TZ2N are set so as to avoid a situation where the first lawnmower MW1 and the second lawnmower MW2 execute work in the same virtual zone VZN at the same time point. Then, in a case where the determination result is negative, the zone changing unit 115 determines to change the virtual zones VZN. Further, for example, the zone changing unit 115 determines whether or not the first time ranges TZ1N and the second time ranges TZ2N are set so as to avoid a situation where the first lawnmower MW1 and the second lawnmower MW2 execute work in neighboring virtual zones VZN at the same time point. Then, in a case where the determination result is negative, the zone changing unit 115 determines to change the virtual zones VZN.

In a case where the zone changing unit 115 determines to change the virtual zones VZN (YES in step S111), the process returns to step S105.

Then, in step S105, the zone dividing unit 112 divides the work area AR into the plural virtual zones VZN (N=1 to M). The number M is eight, for example.

In a case where the zone changing unit 115 determines not to change the virtual zones VZN (NO in step S111), the process moves to step S113.

Then, in step S113, the notification unit 116 notifies the first time ranges TZ1N and the second time ranges TZ2N to the first smartphone 200A. Subsequently, the process is finished.

In such a manner, the notification unit 116 notifies the first time ranges TZ1N and the second time ranges TZ2N to the first smartphone 200A. Thus, the first user carrying the first smartphone 200A can check the first time ranges TZ1N and the second time ranges TZ2N.

Consequently, the first user can check a possibility of contact between the first lawnmower MW1 and the second lawnmower MW2.

As described above, the server device 100 according to the present embodiment includes: the area setting unit 111 which sets the first area AR1 in which the first lawnmower MW1 executes the first lawn-mowing work in the work area AR and the second area AR2 in which the second lawnmower MW2 executes the second lawn-mowing work in the work area AR; the zone dividing unit 112 which divides the work area AR into the plural virtual zones VZN (N=1 to M); the time range setting unit 113 which sets the first time range TZ1N in which the first lawnmower MW1 executes the first lawn-mowing work in each of the virtual zones VZN included in the plural virtual zones VZN and the second time range TZ2N in which the second lawnmower MW2 executes the second lawn-mowing work in each of the virtual zones VZN included in the plural virtual zones VZN (N=1 to M); and the notification unit 116 which notifies the first time range TZ1N and the second time range TZ2N to the smartphone 200 connected to be capable of communication.

Thus, the user carrying the smartphone 200 can check the first time ranges TZ1N and the second time ranges TZ2N. Consequently, the user can check the possibility of contact between the first lawnmower MW1 and the second lawnmower MW2.

Further, in the server device 100, the second lawnmower MW2 has a larger size than the first lawnmower MW1.

Consequently, the lawn-mowing work in the work area AR is executed by combining the first lawnmower MW1 and the second lawnmower MW2 having a larger size than the first lawnmower MW1, and the lawn-mowing work in the work area AR can thereby efficiently be executed.

Further, in the server device 100, the second lawnmower MW2 executes the second lawn-mowing work while autonomously traveling.

Thus, a worker is not necessary who operates or drives the second lawnmower MW2. Consequently, the number of workers necessary for executing the lawn-mowing work in the work area AR can be reduced.

Further, in the server device 100, the first lawnmower MW1 executes the first lawn-mowing work while autonomously traveling.

Consequently, a worker is not necessary who operates or drives the first lawnmower MW1. Consequently, the number of workers necessary for executing the lawn-mowing work in the work area AR can be reduced.

Further, in the server device 100, the time range setting unit 113 sets the first time range TZ1N and the second time range TZ2N so as to avoid a situation where the first lawnmower MW1 and the second lawnmower MW2 execute work in the same virtual zone VZN at the same time point.

Thus, contact between the first lawnmower MW1 and the second lawnmower MW2 can be avoided. Consequently, safety of the lawn-mowing work can be improved.

Further, in the server device 100, the time range setting unit 113 sets the first time range TZ1N and the second time range TZ2N so as to avoid a situation where the first lawnmower MW1 and the second lawnmower MW2 execute work in neighboring virtual zones VZN at the same time point.

Thus, approach of the first lawnmower MW1 to the second lawnmower MW2 can be avoided. Consequently, safety of the lawn-mowing work can further be improved.

Further, in the server device 100, the zone dividing unit 112 divides the work area AR such that each of the plural virtual zones VZN extends along the longitudinal direction of the work area AR.

Thus, in each of the plural virtual zones VZN, the second lawnmower MW2 can efficiently execute the second lawn-mowing work. Consequently, the lawn-mowing work can efficiently be executed.

Further, in the server device 100, the zone dividing unit 112 divides the work area AR into the plural virtual zones VZN based on an input from the user.

Consequently, the work area AR can be divided into the plural virtual zones VZN as desired by the user.

Further, the server device 100 further includes the time calculation unit 114 which calculates the work time T1N of the first lawnmower MW1 and the work time T2N of the second lawnmower MW2 in each of the plural virtual zones VZN.

Thus, the work time T1N of the first lawnmower MW1 and the work time T2N of the second lawnmower MW2 in each of the plural virtual zones VZN can be checked. Consequently, convenience for the user can be improved. For example, the user can decide the number of first lawnmowers MW1 and the number of second lawnmowers MW2 based on the work time T1N and the work time T2N.

Further, the server device 100 further includes the zone changing unit 115 which changes at least one of the shape, the size, and the area of each of the plural virtual zones VZN based on the work time T2N of the second lawnmower MW2 in each of the plural virtual zones VZN.

Thus, for example, at least one of the shape, the size, and the area of each of the plural virtual zones VZN can be changed such that the work time T2N of the second lawnmower MW2 in each of the plural virtual zones VZN becomes equivalent. Consequently, the plural virtual zones VZN can properly be changed.

Further, in the server device 100, the area setting unit 111 sets the first area AR1 and sets the area except the first area AR1 in the work area AR as the second area AR2.

Consequently, because the first area AR1 in which the first lawnmower MW1 with a small size and a low speed compared to the second lawnmower MW2 performs the lawn-mowing work is earlier set than the second area AR2, the first area AR1 can be set such that the first lawnmower MW1 can properly perform detailed work.

Further, in the server device 100, the area setting unit 111 sets the second area AR2 and sets the area except the second area AR2 in the work area AR as the first area AR1.

Consequently, because the second area AR2 in which the second lawnmower MW2 with a large size and a high speed compared to the first lawnmower MW1 performs the lawn-mowing work is earlier set than the first area AR1, the second area AR2 can be set such that the second lawnmower MW2 can efficiently work.

Further, in the server device 100, the area setting unit 111 determines whether or not the second lawnmower MW2 is capable of passing through the second area AR2 based on the size of the second lawnmower MW2. Then, in a case where a determination is made that the second lawnmower MW2 is not capable of passing through the second area AR2, the area setting unit 111 sets the second area AR2 through which the second lawnmower MW2 is determined to be not capable of passing as the first area AR1.

Consequently, because the second area AR2 through which the second lawnmower MW2 is determined to be not capable of passing is set as the first area AR1, the first area AR1 and the second area AR2 can properly be set.

The present invention is not limited to the configurations of the above embodiment but can be carried out in various forms without departing from the scope of the gist thereof.

For example, in the present embodiment, a description is made about a case where the "gardening work" is lawn-mowing work, but this is not restrictive. The "gardening work" may be work other than lawn-mowing work. The "gardening work" may be using a blower, watering, strimming, grass mowing, or the like, for example.

Further, in the present embodiment, a description is made about a case where lawn-mowing work is executed by the first lawnmower MW1 and the second lawnmower MW2, but this is not restrictive. It is sufficient that lawn-mowing work is executed by plural kinds of lawnmowers including the first lawnmower MW1 and the second lawnmower MW2.

For example, lawn-mowing work may be executed by the first lawnmower MW1, the second lawnmower MW2, and a third lawnmower. The third lawnmower is a lawnmower whose travel is operated by the worker while the worker is walking, for example.

Further, for example, lawn-mowing work may be executed by the first lawnmower MW1, the second lawnmower MW2, the third lawnmower, and a fourth work machine. The fourth work machine is a work machine which executes finishing work, for example.

Further, the first lawnmower MW1 and the second lawnmower MW2 may be the same model.

Further, in the present embodiment, a description is made about a case where the first work machine (first lawnmower MW1) is an autonomously traveling gardening work machine (lawnmower), but this is not restrictive. The first work machine may be a work machine which executes first gardening work by being operated by the user.

As one example, the first work machine may be a work machine which executes the first gardening work while the worker is moving. Specifically, the first work machine may be a work machine, such as a walking type lawnmower, which performs work while the user is pushing the work machine from the rear of that or may be a work machine, such as a standing-riding type lawnmower, on which the user rides. Further, the first work machine may be a work machine, which the user holds by a hand to perform work, such as a hand-held type strimmer, blower, or edge trimmer. Further, the first work machine may be a remote-controlled work machine which performs work while the user operates a remote controller in a position close to the work machine or may be a work machine which performs work while a remote-controlled operation and autonomously traveling work are appropriately switched.

As the first work machines raised in the above, even in a case where the work is performed while the user is positioned adjacently to the first work machine, the user checks the smartphone 200 retained by the user himself/herself or accepts a notification from the smartphone 200 and can thereby perform work in a zone in which a possibility of contact with the second work machine is low, and safety of the work can be improved.

Further, compared to a case where the first lawnmower MW1 is an autonomously traveling lawnmower, further detailed work can be executed. Further, the first work machine may be a remotely operated work machine in which a camera is mounted on the first work machine and which is maneuvered while the user is checking an image by the camera from a remote place. Such a work machine has a problem with perception of presence of peripheral objects by the user, but such a work machine is maneuvered while the user is checking a terminal by using the present system and can thereby effectively reduce a risk of contact with the second work machine.

Further, in the present embodiment, a description is made about a case where the second work machine (second lawnmower MW2) is an autonomously traveling gardening work machine (lawnmower), but this is not restrictive.

For example, it can be assumed that the second work machine is a work machine with a larger size than the first work machine (for example, a work machine with high work efficiency such as a large size or a high work speed).

Specifically, the second work machine may be a riding type lawnmower on which the worker rides and which the worker drives, may be a remote-controlled and large-sized work machine which performs work while the user operates a remote controller in a position close to the work machine, or may be a large-sized work machine which performs work while a remote-controlled operation and autonomously traveling work are appropriately switched.

Such a large-sized work machine causes large damage when that contacts with the first work machine or the worker who operates the first work machine compared to a small-sized work machine; however, as in the present system, the large-sized work machine is caused not to work in the same area as the first work machine or in a neighboring area by dividing a zone, a possibility of contact can thereby be reduced, and safety of the work can be improved.

Further, in the present embodiment, a description is made about a case where the server device 100 performs a notification to the smartphone 200, but this is not restrictive. A notification may be performed to the smartphone 200 by an information processing device such as a personal computer.

Further, in the present embodiment, a description is made about a case where the "terminal device" is the smartphone 200, but this is not restrictive. The "terminal device" may be a personal computer or may be a tablet terminal.

Further, at least a part of the function blocks illustrated in FIG. 1 may be realized with hardware or may be configured to be realized in cooperation between hardware and software, and at least a part of the function blocks are not limited to a configuration in which independent hardware resources are arranged as illustrated in FIG. 1.

Further, the control program 117 executed by the server device 100 may be stored in another storage unit in the memory. Further, a configuration is possible in which the control program 117 stored in an external device is acquired via a communication unit or the like and is executed.

Further, process units in the flowchart illustrated in FIG. 6 are process units resulting from division corresponding to main process contents for easy understanding of the process by the server device 100. Embodiments are not restricted by a manner for dividing the process units illustrated in the flowchart illustrated in FIG. 6 or names of those. Further, the process by the server device 100 can be divided into more process units in accordance with process contents, and one process unit can also be divided to include more processes. Further, process order of the above flowchart is not limited to the illustrated example.

REFERENCE SIGNS LIST

1 gardening assistance system
100 server device
110 control unit
110A processor
110B memory
111 area setting unit
112 zone dividing unit
113 time range setting unit
114 time calculation unit
115 zone changing unit
116 notification unit
117 control program
118 work area storage unit
200 smartphone
200A first smartphone
200B second smartphone
200C third smartphone
AR work area
AR1 first area
AR2 second area
BN bench
M number
MW1 first lawnmower (first work machine)
MW2 second lawnmower (second work machine)
TR tree
T time
T1N, T2N work time
TW1 first work time
TW2 second work time
TZ1N, TZ11 to TZ18 first time range
TZ2N, TZ21 to TZ28 second time range
VZ1N, VZ11 to VZ14 first virtual zone
VZ2N, VZ21 to VZ28 second virtual zone
VZN virtual zone

The invention claimed is:

1. A system comprising:
   at least one terminal device; and
   a server device connected with the at least one terminal device via a network to be capable of communication with the at least one terminal device, the server device comprising a processor that includes:
   an area setting unit which sets a first area in which a first work machine executes first gardening work in a work area and a second area in which a second work machine executes second gardening work in the work area;
   a zone dividing unit which divides the work area into plural virtual zones;
   a time range setting unit which sets a first time range in which the first work machine executes the first gardening work in each of the virtual zones included in the plural virtual zones and a second time range in which the second work machine executes the second gardening work in each of the virtual zones included in the plural virtual zones; and
   a notification unit which communicates with the at least one terminal device and causes the at least one terminal device to display the first time range and the second time range.

2. The system according to claim 1, wherein
the second work machine has a larger size than the first work machine.

3. The system according to claim 2, wherein
the second work machine executes the second gardening work while autonomously traveling.

4. The system according to claim 3, wherein
the area setting unit sets the first area and sets an area except the first area in the work area as the second area.

5. The system according to claim 4, wherein
the area setting unit determines whether or not the second work machine is capable of passing through the second area based on a size of the second work machine, and
in a case where a determination is made that the second work machine is not capable of passing through the second area, the area setting unit sets the second area through which the second work machine is determined to be not capable of passing as the first area.

6. The system according to claim 3, wherein
the area setting unit sets the second area and sets an area except the second area in the work area as the first area.

7. The system according to claim 6, wherein
the area setting unit determines whether or not the second work machine is capable of passing through the second area based on a size of the second work machine, and
in a case where a determination is made that the second work machine is not capable of passing through the second area, the area setting unit sets the second area through which the second work machine is determined to be not capable of passing as the first area.

8. The system according to claim 2, wherein
the area setting unit sets the first area and sets an area except the first area in the work area as the second area.

9. The system according to claim 8, wherein
the area setting unit determines whether or not the second work machine is capable of passing through the second area based on a size of the second work machine, and
in a case where a determination is made that the second work machine is not capable of passing through the second area, the area setting unit sets the second area through which the second work machine is determined to be not capable of passing as the first area.

10. The system according to claim 2, wherein
the area setting unit sets the second area and sets an area except the second area in the work area as the first area.

11. The system according to claim 10, wherein
the area setting unit determines whether or not the second work machine is capable of passing through the second area based on a size of the second work machine, and
in a case where a determination is made that the second work machine is not capable of passing through the second area, the area setting unit sets the second area through which the second work machine is determined to be not capable of passing as the first area.

12. The system according to claim 1, wherein
the first work machine executes the first gardening work while autonomously traveling.

13. The system according to claim 1, wherein
the time range setting unit sets the first time range and the second time range so as to avoid a situation where the first work machine and the second work machine execute work in the same virtual zone at the same time point.

14. The system according to claim 13, wherein
the time range setting unit sets the first time range and the second time range so as to avoid a situation where the first work machine and the second work machine execute work in neighboring virtual zones at the same time point.

15. The system according to claim 1, wherein
the zone dividing unit divides the work area such that each of the plural virtual zones extends along a longitudinal direction of the work area.

16. The system according to claim 1, wherein
the zone dividing unit divides the work area into the plural virtual zones based on an input from a user.

17. The system according to claim 1, wherein
the processor further includes a time calculation unit which calculates a work time of the first work machine and a work time of the second work machine in each of the plural virtual zones.

18. The system according to claim 17, wherein
the processor further includes a zone changing unit which changes at least one of a shape, a size, and an area of each of the plural virtual zones based on the work time of the second work machine in each of the plural virtual zones.

* * * * *